(12) United States Patent
Veitch

(10) Patent No.: US 9,291,401 B2
(45) Date of Patent: Mar. 22, 2016

(54) SPLIT FLOW CONDENSING ECONOMIZER AND HEAT RECOVERY METHOD

(71) Applicant: Combustion & Energy Systems Ltd., Markham (CA)

(72) Inventor: Daniel H. Veitch, Churchill (CA)

(73) Assignee: COMBUSTION & ENERGY SYSTEMS LTD., Markham (CA)

( * ) Notice: Subject to any disclaimer, the term of this patent is extended or adjusted under 35 U.S.C. 154(b) by 66 days.

(21) Appl. No.: 14/188,302

(22) Filed: Feb. 24, 2014

(65) Prior Publication Data

US 2015/0241138 A1    Aug. 27, 2015

(51) Int. Cl.
    *F22B 1/18*    (2006.01)
    *F28D 21/00*   (2006.01)
    *F28D 7/16*    (2006.01)

(52) U.S. Cl.
    CPC .......... *F28D 21/0003* (2013.01); *F28D 7/1623* (2013.01); *F24D 2200/18* (2013.01)

(58) Field of Classification Search
    CPC ..................................................... F24J 3/084
    USPC .................. 122/33, 34, 7 R, 406.1, 123, 124; 165/108, 161, 168, 173, 154, 181
    See application file for complete search history.

(56) References Cited

U.S. PATENT DOCUMENTS

| | | | |
|---|---|---|---|
| 1,150,948 A * | 8/1915 | Laziny ........................... | 122/123 |
| 2,596,057 A | 5/1952 | Van Heeckeren et al. | |
| 3,628,508 A | 12/1971 | Kummel | |
| 4,170,963 A | 10/1979 | Siegrist | |
| 4,192,260 A * | 3/1980 | Ostbo ......................... | 122/182.1 |
| 4,448,348 A | 5/1984 | Bidwell | |
| 4,498,524 A | 2/1985 | Jacobsen | |
| 4,700,772 A | 10/1987 | Baumberger | |
| 5,699,756 A | 12/1997 | Ross et al. | |
| 5,843,214 A * | 12/1998 | Janes .............................. | 96/242 |
| 6,612,301 B2 | 9/2003 | Vago | |
| 7,290,503 B2 | 11/2007 | Missoum et al. | |
| 7,302,916 B2 * | 12/2007 | LeMer et al. ................. | 122/18.1 |
| 7,481,265 B2 | 1/2009 | Youssef | |
| 8,006,651 B2 | 8/2011 | Veitch et al. | |
| 2007/0181081 A1 | 8/2007 | Missoum et al. | |

FOREIGN PATENT DOCUMENTS

| | | |
|---|---|---|
| EP | 1703244 | 9/2006 |
| EP | 2133630 | 12/2009 |
| JP | 2009144606 | 7/2009 |
| WO | 2007084011 A1 | 7/2007 |
| WO | 2008138128 | 11/2008 |

* cited by examiner

*Primary Examiner* — Gregory A Wilson
(74) *Attorney, Agent, or Firm* — Hodgson Russ LLP

(57) ABSTRACT

A condensing heat exchange economizer wherein upwardly flowing hot flue gas is apportioned by a damper among a plurality of reverse flow passages and redirected to flow in a downward direction through the reverse flow passages over respective bundles of heat exchange tubes carrying a counter-flowing heat exchange medium to form condensate and cool the flue gas. The economizer may comprise a housing having a main flow duct defining a main flow passage in which the damper is located, a pair of conduits opposing one another across the main flow duct and defining respective reverse flow passages, and a pair of return channels opposing one another across the main flow duct and defining respective return flow passages. The cooled flue gas may be merged with the main flow passage at a location above the damper.

21 Claims, 5 Drawing Sheets

SECTION B-B

SECTION A-A

SECTION B-B

SECTION C-C

SECTION D-D

SPLIT FLOW CONDENSING ECONOMIZER AND HEAT RECOVERY METHOD

FIELD OF THE INVENTION

The present invention relates generally to condensing heat exchange systems and methods for recovering heat from flue or exhaust gases. As used in the present specification, the term "flue gas" means any flue gas and/or any exhaust gas.

BACKGROUND OF THE INVENTION

Condensing heat recovery involves the removal of a significant quantity of heat from waste exhaust gases, to the point where the exhaust gas actually condenses and water vapor drops out as condensate. Because of recent market forces urging energy efficiency, the application of condensing heat recovery has become more popular. Condensing heat recovery systems, or "economizers," are available as original equipment or for retrofit in a flue gas stack to allow heat energy to be recovered and used. In cylindrical economizers of the prior art, the rising flue gas enters the bottom of the economizer and is channeled upwardly across a tube bundle of a heat exchanger such that liquid condensate forms on the tubes of the heat exchanger and drops downward against the flow of the flue gas. Consequently, a portion of the condensate is re-evaporated by the hot flue gas and does not aid in heat transfer efficiency. Also, in existing designs where the exchanger tubes are in line with the exhaust gas traveling upward and the water being heated is draining downward, it is very difficult to keep the condensate from draining down into the boiler or heat source. Because the condensate is corrosive, its effect on heat source equipment is of great concern.

U.S. Pat. No. 8,006,651 addresses these concerns by providing a "reverse flow" economizer wherein the upwardly flowing hot flue gas is redirected in a downward direction through heat exchange tubes, and then the cooled flue gas is reintroduced into the exhaust path for discharge. A heat exchange medium is introduced through a lower inlet and counter-flows upward through the heat exchange tubes to an upper outlet. Condensate formed on the heat exchange apparatus drops by gravity and is not exposed to hot flue gas, thereby avoiding unwanted re-vaporization of the condensate. The described economizer includes cylindrical inner and outer shells arranged concentrically about a cylindrical flow duct arranged to receive the upwardly flowing flue gas. The inner shell defines a secondary flow passage in which the heat exchange tubes is arranged for cooling the downwardly flowing flue gas, and the outer shell defines a tertiary flow passage by which the cooled flue gas travels upwardly and returns to the primary flow duct. The economizer taught in U.S. Pat. No. 8,006,651 provides an efficient system, but has practical drawbacks. The cylindrical design is laborious to assemble, and the heat exchange tubes reside in an inaccessible zone between the primary flow duct and the outer shell, making maintenance very difficult.

What is needed is an economizer that provides similar operating efficiencies, yet is easier to fabricate and maintain.

SUMMARY OF THE INVENTION

An economizer of the present invention provides efficient recovery of heat energy from hot flue gas, and is easy to fabricate and maintain.

In accordance with the present invention, a stream of flue gas traveling upwardly through a main flow passage is divided among a plurality of different reverse flow passages and each portion of the flue gas stream is redirected to flow in a downward direction through a respective one of the reverse flow passages. Each reverse flow passage contains a respective bundle of heat exchange tubes carrying a heat exchange medium, wherein the downwardly flowing flue gas interacts with the heat exchange tubes to form condensate and cool the flue gas. The cooled flue gas is then redirected to flow in an upward direction through at least one return flow passage. The cooled flue gas is then redirected upwardly through one or more return flow passages, and may rejoin the main flow passage at a location above the location at which the flue gas was first diverted to the reverse flow passages. As used herein, "above" and "below" refer to relative heights at which two elements are located, and do not mean that one element is directly above or below another.

An economizer formed in accordance with an embodiment of the present invention generally comprises a main duct, first and second conduits in flow communication with the main duct, and at least one return channel in flow communication with each of the first and second conduits and with the main duct. The main duct defines a main flow passage for flue gas traveling in an upward direction. The first and second conduits define respective first and second reverse flow passages for flue gas traveling in a downward direction. Each return channel defines a return flow passage by which cooled flue gas travels upward and reenters the main flow passage.

The economizer embodiment further comprises an adjustable damper arranged in the main flow passage (as used herein, the term "damper" means a damper or a baffle). The damper redirects a first portion of the upwardly traveling flue gas into the first reverse flow passage, and redirects a second portion of the upwardly traveling flue gas into the second reverse flow passage. The economizer embodiment also comprises a first bundle of heat exchange tubes within the first reverse flow passage and a second bundle of heat exchange tubes within the second reverse flow passage. The heat exchange tubes carry a heat exchange medium. The first and second portions of flue gas interact with respective bundles of heat exchange tubes, whereby condensate is formed and flows in the downward direction by force of gravity. The economizer embodiment may include two return flow passages, wherein each return flow passage receives cooled flue gas from both reverse flow passages. The return flow passages may be configured to cause the cooled flue gas to reenter the main flow passage at a location above the damper.

Advantageously, the economizer embodiment may have condensate drains in each of the first and second conduits so that condensate may be removed from the economizer and is not re-vaporized by hot flue gas.

As will be appreciated, the conduits containing the bundles of heat exchange tubes have at least one exterior wall, such that a removable panel or door may be provided for permitting direct access to a corresponding bundle for maintenance and repair. In an alternative embodiment, the bundles may be mounted on track mechanisms for "pull out" servicing.

The invention also provides a method of recovering heat from hot flue gas generally comprising the steps of A) dividing a stream of upwardly flowing flue gas among a plurality of different reverse flow passages; redirecting each portion of flue gas to flow in a downward direction through a respective one of the plurality of reverse flow passages; C) providing a respective bundle of heat exchange tubes in each of the plurality of reverse flow passages, the heat exchange tubes carrying a heat exchange medium, wherein the downwardly flowing flue gas interacts with the heat exchange tubes to form condensate and cool the flue gas; and D) redirecting the cooled flue gas to flow in an upward direction through at least one return flow passage.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
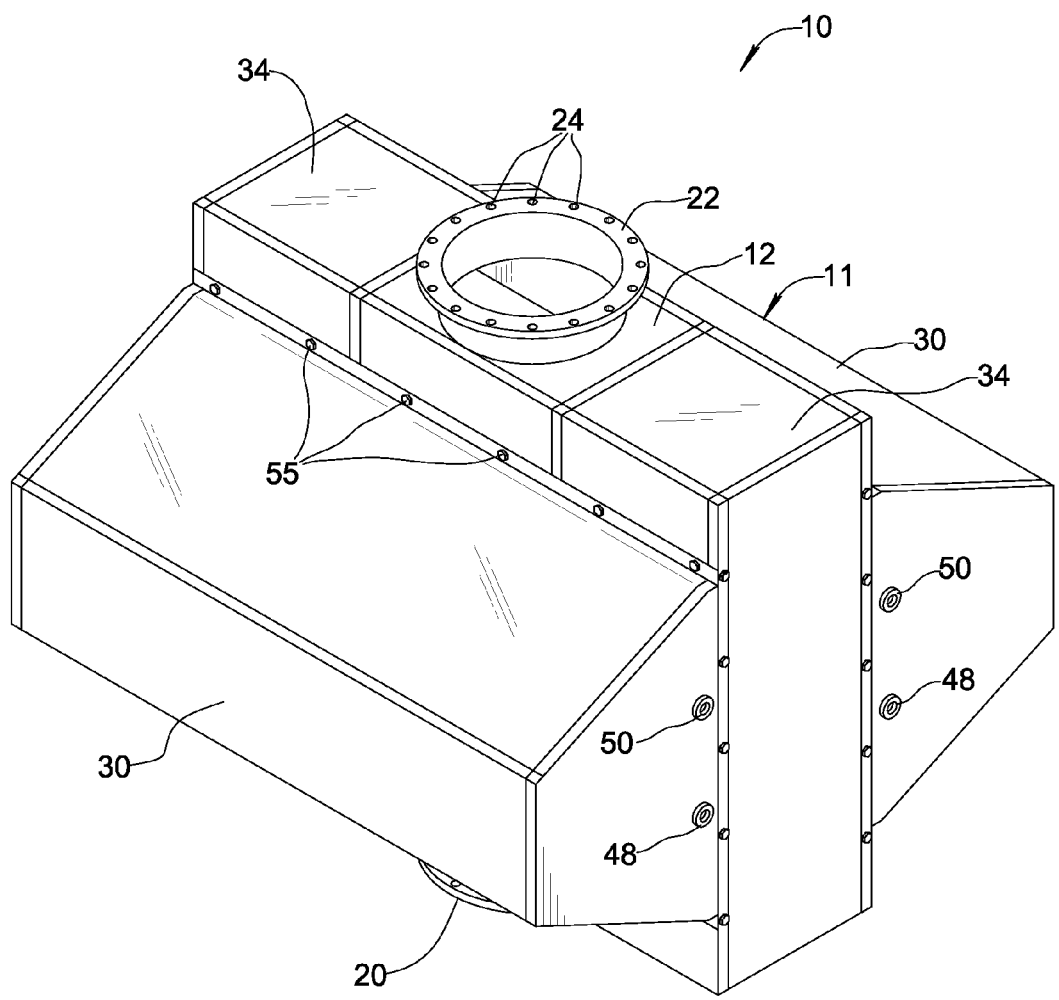
FIG. 1 is an orthogonal view of an economizer formed in accordance with an embodiment of the present invention.
Figure 2:
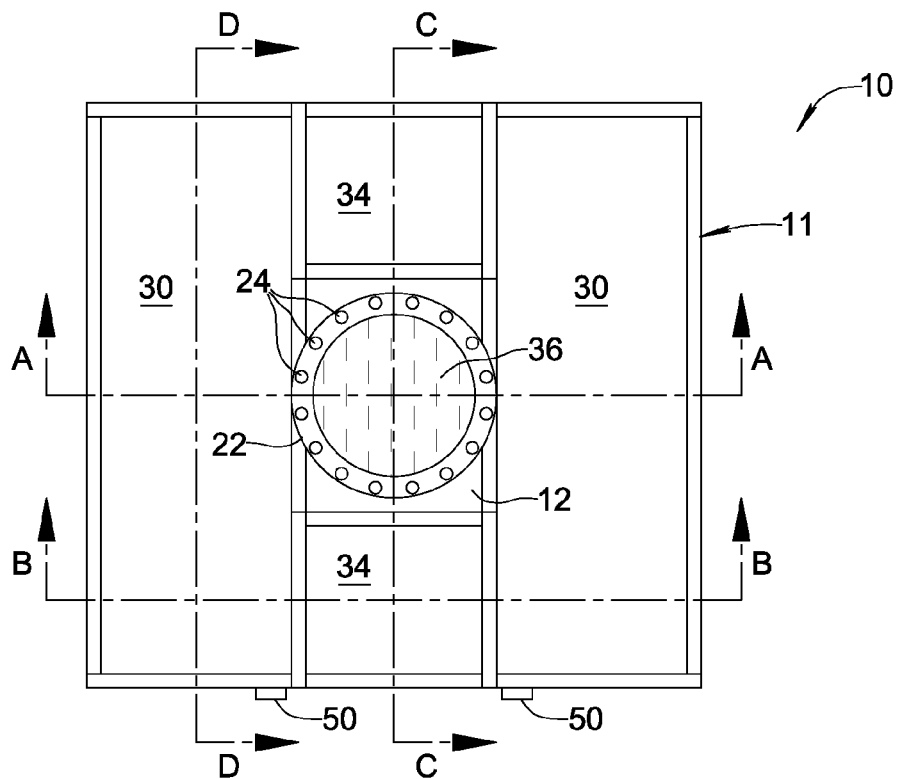
FIG. 2 is a top plan view of the economizer shown in FIG. 1.
Figure 3:
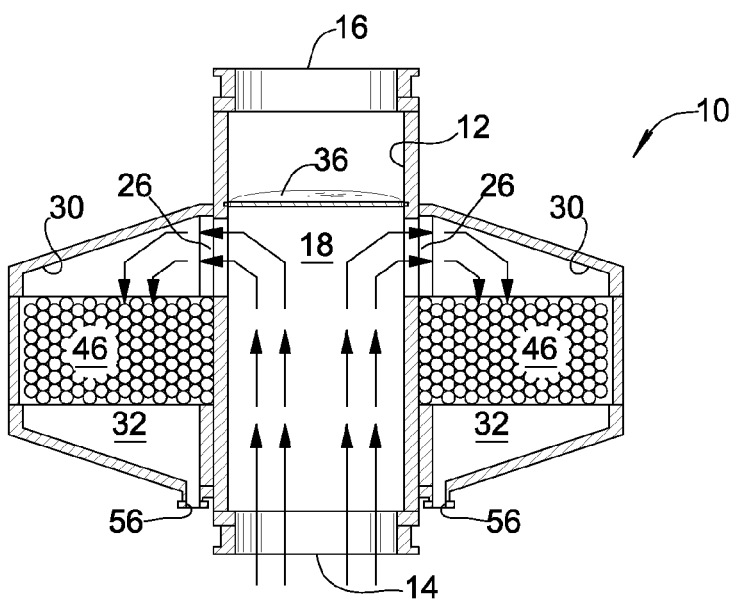
FIG. 3 is a cross-sectional view of the economizer taken generally along the line A-A in FIG. 2.

FIGS. 1-6 show an economizer 10 formed in accordance with an embodiment of the present invention. Economizer 10 is intended to be installed in-line with a flue gas stack for recovering heat energy carried by the hot flue gas that would otherwise be lost to the atmosphere.

Economizer 10 comprises a housing 11 that includes a main flow duct 12 having an inlet end 14 and an outlet end 16. Main duct 12 defines a main flow passage 18 for flue gas traveling in an upward direction. Main duct 12 includes a lower flange 20 and an upper flange 22 each having a pattern of bolt holes 24 for use in attachment of main duct 12 in-line with a flue stack (not shown). Main duct 12 also includes a pair of redirection ports 26 arranged on opposite front and rear sides of main duct 12, and a pair of merge ports 28 arranged on opposite lateral sides of main duct 12 at a location above redirection ports 26.

Economizer housing 11 further includes a pair of conduits 30 in flow communication with the main duct 12. Each conduit 30 defines a respective reverse flow passage 32 for flue gas traveling in a downward direction. As may be understood, redirection ports 26 provide flow communication between main flow passage 18 and the reverse flow passages 32 defined by conduits 30. Each conduit 30 has an exterior wall 31. As used herein, the term "exterior wall" is intended to mean that the wall is on the exterior of housing 11 such that it would face a service technician without any intervening walls between the exterior wall and the technician. Exterior wall 31 may be characterized by top sloped portion 31A that slants downward as it extends outward from main duct 12, a bottom sloped portion 31B that slants upward as it extends outward from main duct 12, and a vertical portion 31C connecting the top and bottom sloped portions.

A damper 36 is arranged in main flow passage 18 just above redirection ports 26 and is operable to redirect upwardly traveling flue gas horizontally outward through redirection ports 26 and into reverse flow passages 32, where the redirected flue gas is confined for travel in a downward direction through each reverse flow passage. Damper 36 may be disc-shaped and sized to occlude flow through main flow passage 18 when it is orientated in a plane normal to the longitudinal axis of main duct 12. Damper 36 may be mounted on a horizontal axle 38 rotatably supported by main duct 12, whereby damper 36 may be rotated about an axis defined by axle 38 to control the portion of flue gas diverted from main flow passage 18 to reverse flow passages 32. The damper 36 may have other configurations designed for evenly distributing the flow of flue gas to among the plurality of reverse flow passages 32. For example, in an embodiment having two conduits 30 on opposite sides of main duct 12, damper 36 may have a contoured undersurface for evenly distributing vertical flue gas flow in main duct 12 into two oppositely-directed streams of horizontal flow through redirection ports 26 and into the two conduits 30. A distribution grid (not shown), such as perforated sheet, may be associated with each horizontal flow portion so that the flow is evenly distributed within each reverse flow passage 32.

An operating condition wherein most of the flue gas is diverted is shown in FIGS. 1-6, however damper 36 may be rotated into a vertical plane to open main flow passage 18 so as not to divert flue gas to reverse flow passages 32. Damper 36 may be rotated into a fully horizontal plane to divert all the upwardly flowing flue gas in main flow passage 18 into reverse flow passages 32. Other intermediate orientations of damper 36 are also possible for diverting any desired portion of the flue gas into reverse flow passages 32. A motor (not shown) may be operably connected to damper 36 for automatically adjusting damper position to control the portion of flue gas that is diverted to reverse flow passages 32. The motor may be connected to a remotely-located control system (not shown) to provide for remote operation of damper 36. As may be understood, the control system may be responsive to sensor signals and may be programmed to adjust damper 36 to automatically maintain a desired condition by way of a feedback loop.

While a rotational damper is shown, other damper arrangements may be used, including a damper that slides into main flow passage 18 or a damper that pivots into main flow passage 18 about a vertical pivot axis, without straying from the present invention.

As will be understood, sloped walls 31A help redirect horizontal flow entering reverse flow passages 32 to a downward flow direction. A respective bundle of heat exchange tubes 46 is enclosed within each conduit 30 such that tubes 46 occupy each reverse flow passage 32, whereby flue gas must travel across the tubes as it flows in a downward direction. Tubes 46 carry a heat exchange medium, for example water, entering the bundle through a lower inlet 48 in a relatively cold state and exiting the bundle through an upper outlet 50 in a heated state due to heat transfer associated with condensation of water vapor in the flue gas. As will be understood, the hot flue gas interacts initially with tubes higher up in the bundle which are carrying heat exchange medium that is warmer than it was when it traveled through the tubes lower down in the bundle, and as the flue gas is cooled it subsequently interacts with tubes lower down in the bundle which are carrying cooler heat exchange medium. Condensate formed on the tubes drains down and is not exposed to hot flue gas tending to re-vaporize the condensate. Accordingly, heat exchange efficiency of economizer 10 is improved.

It is advantageous that an external wall of housing 11 includes at least one removable panel or at least one door permitting access to each of the plurality of bundles of heat exchange tubes 46. In the embodiment shown, each external wall 31 is attached to the remainder of housing 11 by bolts 55 such that external wall 31 acts as a removable panel permitting access to heat exchange tubes 46, thereby facilitating maintenance and tube repairs or replacement. Alternatively, a selected portion 31A, 31B, and/or 31C of external wall 31 may be hingedly or slidably connected to housing 11 to provide a door that opens and closes for easy access. Of course, a removable panel or door may be formed within a portion of external wall 31, rather than using the entire wall portion to define the panel or door.

Figure 4:
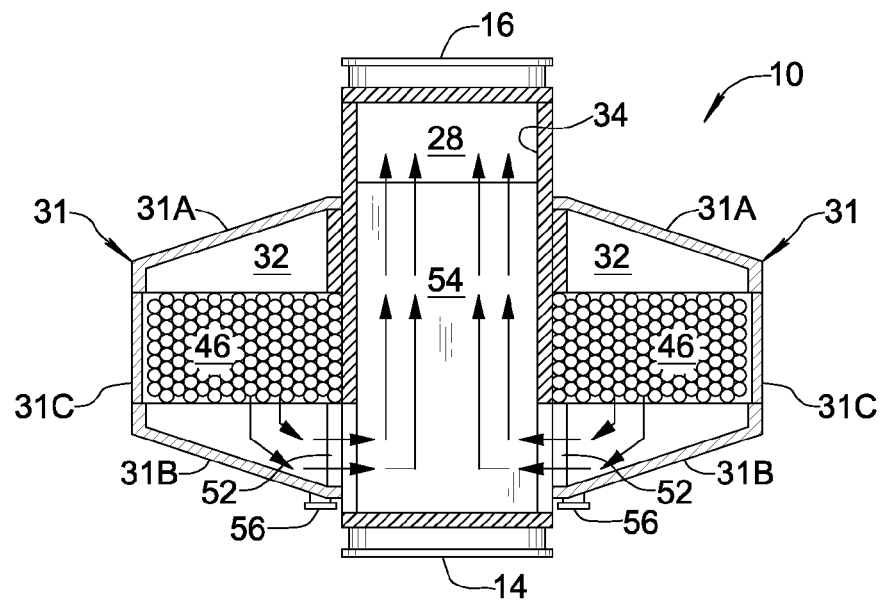
FIG. 4 is a cross-sectional view of the economizer taken generally along the line B-B in FIG. 2.

As illustrated in FIG. 4, the cooled flue gas leaves reverse flow passages 32 through respective discharge openings 52 at a bottom end of each conduit 30. In the embodiment shown, each conduit 30 has two discharge openings 52 spaced horizontally at opposite sides of the conduit, and a pair of return channels 34 are arranged between the conduits 30 to receive the cooled flue gas via discharge openings 52. As will be appreciated, sloped walls 31B help redirect the downwardly flowing gas to a horizontal direction for passage through discharge openings 52. Each conduit 30 may include a condensate drain 56 through which liquid condensate is removed from the economizer. The shape of drains 56 is subject to design choice. For example, a trough drain may be used instead of the illustrated round drain.

Figure 5:
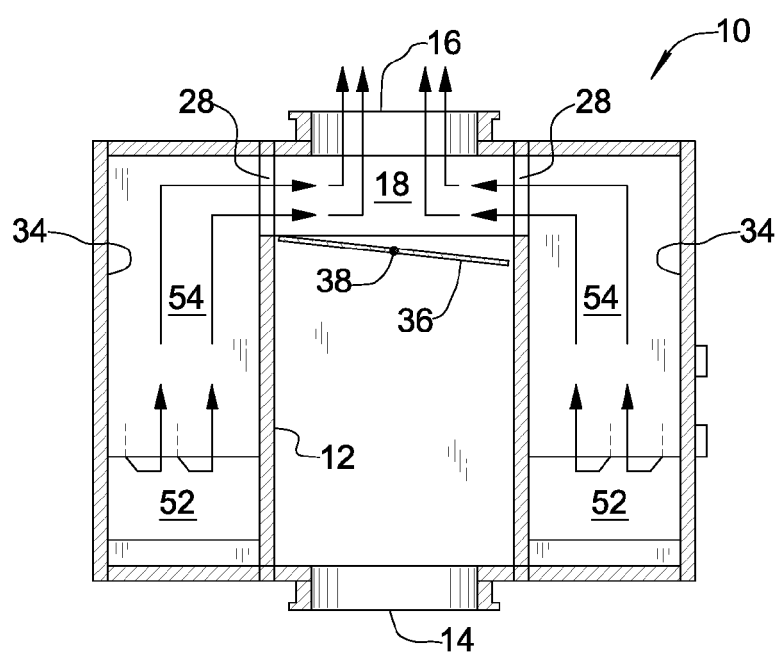
FIG. 5 is a cross-sectional view of the economizer taken generally along the line C-C in FIG. 2.
Figure 6:
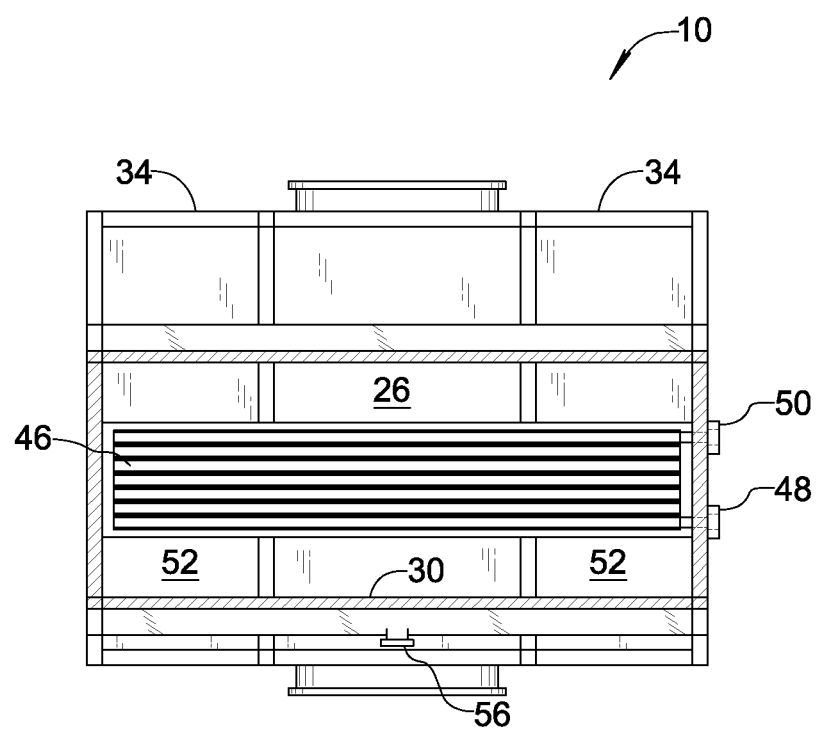
FIG. 6 is a cross-sectional view of the economizer taken generally along the line D-D in FIG. 2.

Each return channel 34 defines a return flow passage 54 by which cooled flue gas travels upward and reenters the main flow passage 18 at a location above damper 36. As shown in FIG. 5, each return channel 34 is in flow communication with main duct 12 via a respective merge port 28. The upwardly flowing cooled flue gas rejoins main flow passage 18 to continue flowing upwardly out of the economizer.

Economizer 10 may be provided with external structural support members (not shown) suitably arranged and configured for attaching economizer 10 to an existing exhaust stack and distributing weight of the economizer in a safe manner. The particular arrangement and configuration of support members will depend upon the design of economizer 10 and the mounting conditions of the exhaust stack into which economizer 10 is incorporated, and are subject to design choice.

Figure 7:
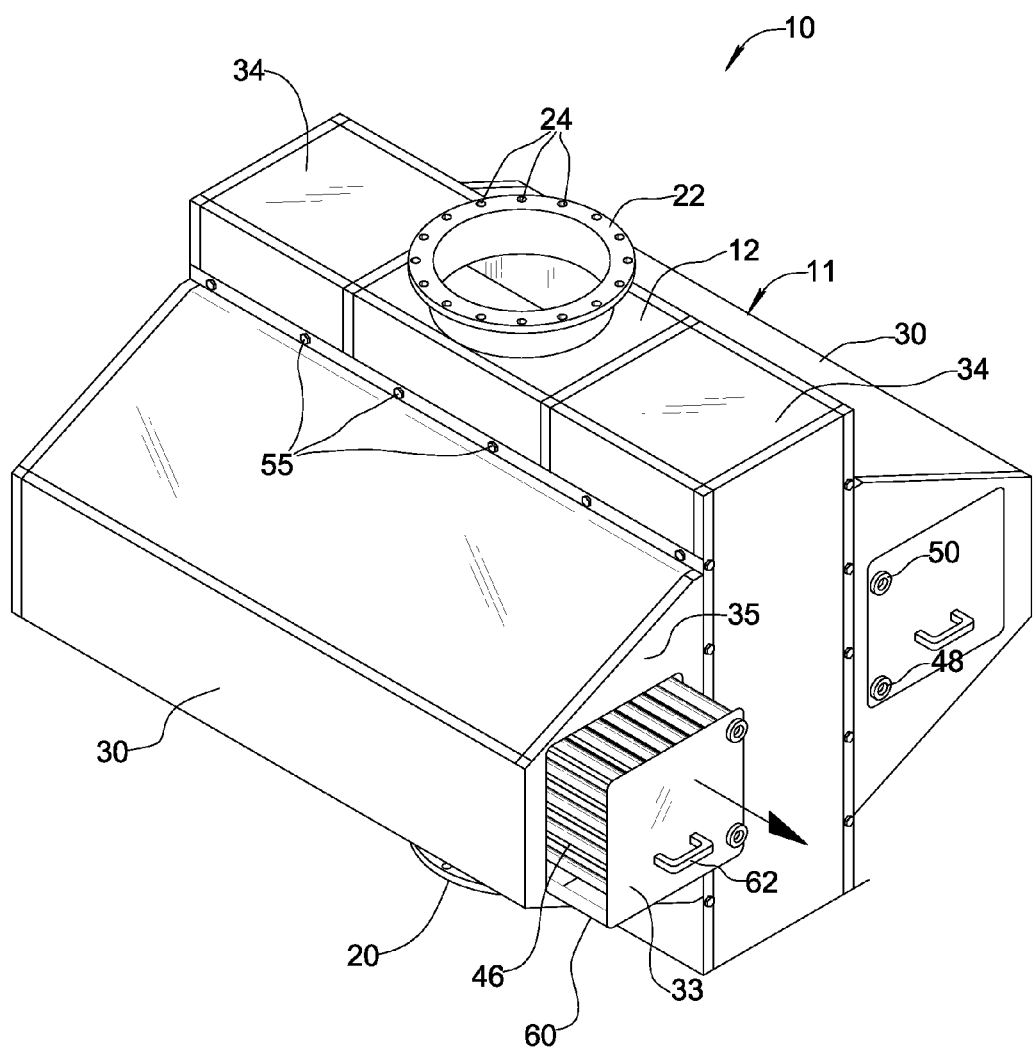
FIG. 7 is an orthogonal view of an economizer formed in accordance with another embodiment of the present invention.

FIG. 7 illustrates an alternative embodiment of economizer 10 wherein bundles 46 are mounted for easy "pull-out" servicing. For sake of illustration, one of the bundles 46 is shown being pulled out of housing 11. The bundle 46 is carried on a horizontal track mechanism 60, whereby the bundle 46 is slidable out of housing 11. A sealing access panel 33 is mounted on the front of bundle 46 and has a handle 62. Access panel 33 is configured to seal with surrounding housing wall 35 when bundle 46 is returned into housing 11. A similar pull-out arrangement may be provided for both bundles 46.

The embodiments described above provide an economizer wherein the main duct 12 is at a center region of the economizer, first and second conduits 30 oppose one another across the main duct 12, and first and second return channels 34 oppose one another across the main duct. In the disclosed configuration, each of the first and second conduits 30 is adjacent to main duct 12 and to first and second return channels 34. It is contemplated to fabricate the components of economizer 10 from stainless steel or structural aluminum, with suitable surface treatments being provided to resist corrosion. Housing 11 avoids nested cylindrical components found in prior U.S. Pat. No. 8,006,651, making it simpler to fabricate. The described embodiment is space efficient, easy to fabricate, and easy to maintain.

As will be appreciated from the foregoing description, the present invention further encompasses a method of recovering heat from hot flue gas. The method generally comprises the steps of dividing a stream of upwardly flowing flue gas among a plurality of different reverse flow passages 32; redirecting each portion of flue gas to flow in a downward direction through a respective one of the plurality of reverse flow passages; providing a respective bundle of heat exchange tubes 46 in each of the plurality of reverse flow passages 32, the heat exchange tubes carrying a heat exchange medium, wherein the downwardly flowing flue gas interacts with the heat exchange tubes to form condensate and cool the flue gas; and redirecting the cooled flue gas to flow in an upward direction through at least one return flow passage 54. The cooled flue gas may be redirected to flow in an upward direction through a plurality of different return flow passages 54. In this regard, each of the plurality of return flow passages 54 may receive cooled flue gas from more than one reverse flow passage 32.

What is claimed is:

1. An economizer for installation in a flue gas stream to recover heat energy from the flue gas stream, the economizer comprising:
   a housing defining a main flow passage through which flue gas travels in an upward direction, a plurality of reverse flow passages in flow communication with the main flow passage through which flue gas received from the main flow passage travels in a downward direction, and at least one return flow passage in flow communication with the plurality of reverse flow passages through which flue gas received from plurality of reverse flow passages travels in an upward direction; and
   a damper arranged in the main flow passage, the damper redirecting upwardly traveling flue gas into the plurality of reverse flow passages;
   a plurality of bundles of heat exchange tubes respectively located in the plurality of reverse flow passages, the heat exchange tubes carrying a heat exchange medium, wherein flue gas interacts with one of the plurality of bundles of heat exchange tubes as the flue gas travels in the downward direction through one of the plurality of reverse flow passages such that condensate is formed, the condensate flowing in the downward direction by force of gravity;
   wherein the housing includes at least one removable panel or at least one door permitting access to each of the plurality of bundles of heat exchange tubes.

2. The economizer according to claim 1, wherein the at least one return flow passage is in flow communication with the main flow passage such that flue gas in a cooled state is returned to the main flow passage at a location above the damper.

3. The economizer according to claim 1, wherein the damper is adjustable relative to the main flow passage to redirect none, some, or all of the upwardly traveling flue gas into the plurality of reverse flow passages.

4. The economizer according to claim 1, wherein each of the plurality of bundles has an inlet through which the heat exchange medium enters the heat exchange tubes of the bundle and an outlet through which the heat exchange medium exits the heat exchange tubes of the bundle, wherein the outlet is above the inlet.

5. The economizer according to claim 1, wherein the housing includes at least one condensate drain through which condensate is removed from the economizer.

6. The economizer according to claim 1, wherein at least one of the plurality of bundles is mounted on a track mechanism permitting the bundle to be withdrawn from and returned to the housing.

7. The economizer according to claim 6, wherein the removable panel is mounted on the bundle.

8. An economizer for installation in a flue gas stream to recover heat energy from the flue gas stream, the economizer comprising:
- a main duct having an inlet end and an outlet end, the main duct defining a main flow passage for flue gas traveling in an upward direction;
- a first conduit in flow communication with the main duct and defining a first reverse flow passage for flue gas traveling in a downward direction;
- a second conduit in flow communication with the main duct and defining a second reverse flow passage for flue gas traveling in a downward direction;
- a damper arranged in the main flow passage, the damper redirecting a first portion of the upwardly traveling flue gas into the first reverse flow passage, and the damper redirecting a second portion of the upwardly traveling flue gas into the second reverse flow passage, wherein the first portion of flue gas travels in a downward direction through the first reverse flow passage and the second portion of flue gas travels in a downward direction through the second reverse flow passage;
- a first bundle of heat exchange tubes within the first reverse flow passage and a second bundle of heat exchange tubes within the second reverse flow passage, the heat exchange tubes carrying a heat exchange medium, wherein the first portion of flue gas interacts with the first bundle of heat exchange tubes and the second portion of flue gas interacts with the second bundle of heat exchange tubes, whereby condensate is formed and flows in the downward direction by force of gravity; and
- at least one return channel in flow communication with each of the first and second conduits and in flow communication with the main duct, the return channel defining a return flow passage by which cooled flue gas travels upward and reenters the main flow passage at a location above the damper.

9. The economizer according to claim 8, wherein the at least one return channel comprises:
- a first return channel defining a first return flow passage by which a first portion of the cooled flue gas travels upward and reenters the main flow passage; and
- a second return channel defining a second return flow passage by which a second portion of the cooled flue gas travels upward and reenters the main flow passage.

10. The economizer according to claim 9, wherein the main duct is at a center region of the economizer.

11. The economizer according to claim 8, wherein the first and second conduits oppose one another across the main duct.

12. The economizer according to claim 8, wherein the first and second return channels oppose one another across the main duct.

13. The economizer according to claim 9, wherein each of the first and second conduits is adjacent to the main duct, the first return channel, and the second return channel.

14. The economizer according to claim 8, wherein the first conduit includes an exterior wall and the second conduit includes another exterior wall.

15. The economizer according to claim 8, wherein each of the first and second conduits has a sloped top wall.

16. The economizer according to claim 8, wherein each of the first and second conduits has a sloped bottom wall.

17. The economizer according to claim 8, wherein the heat exchange medium enters the first bundle through a first inlet and exits the first bundle through a first outlet located at an elevation above the first inlet, and the heat exchange medium enters the second bundle through a second inlet and exits the second bundle through a second outlet located at an elevation above the second inlet.

18. The economizer according to claim 8, wherein the first conduit has a first condensate drain through which condensate formed in the first reverse flow passage is removed from the economizer, and the second conduit has a second condensate drain through which condensate formed in the second reverse flow passage is removed from the economizer.

19. A method of recovering heat from hot flue gas, the method comprising the steps of:
- A) dividing a stream of upwardly flowing flue gas among a plurality of different reverse flow passages in a housing;
- B) redirecting each portion of flue gas to flow in a downward direction through a respective one of the plurality of reverse flow passages;
- C) providing a respective bundle of heat exchange tubes in each of the plurality of reverse flow passages, wherein access to each bundle of heat exchange tubes is permitted by removing at least one panel or at least one door included in the housing, the heat exchange tubes carrying a heat exchange medium, wherein the downwardly flowing flue gas interacts with the heat exchange tubes to form condensate and cool the flue gas; and
- D) redirecting the cooled flue gas to flow in an upward direction through at least one return flow passage.

20. The method according to claim 19, wherein the cooled flue gas is redirected to flow in an upward direction through a plurality of different return flow passages.

21. The method according to claim 20, wherein each of the plurality of return flow passages receives cooled flue gas from more than one reverse flow passage.

* * * * *